(12) United States Patent  
Fukumura et al.

(10) Patent No.: US 6,799,669 B2  
(45) Date of Patent: Oct. 5, 2004

(54) DYNAMIC CLUTCH CONTROL

(75) Inventors: Tomohiro Fukumura, Rochester Hills, MI (US); Brian J. Marlett, Shelby Township, MI (US); Sanjaya Kumar Dash, Rochester Hills, MI (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 40 days.

(21) Appl. No.: 10/243,478

(22) Filed: Sep. 13, 2002

(65) Prior Publication Data

US 2003/0050151 A1 Mar. 13, 2003

Related U.S. Application Data

(60) Provisional application No. 60/318,944, filed on Sep. 13, 2001.

(51) Int. Cl.$^7$ .................. B60K 28/00; E05E 15/00
(52) U.S. Cl. .................. 192/105 R; 49/31; 49/360; 180/286; 180/289; 296/155
(58) Field of Search .................. 192/103 R, 104 R, 192/105 R, 106 R; 180/286, 289; 49/31, 360; 296/155; 318/443, 461, 465

(56) References Cited

U.S. PATENT DOCUMENTS

| | | | | |
|---|---|---|---|---|
| 4,343,387 A | * | 8/1982 | Hofbauer | 477/89 |
| 4,732,246 A | * | 3/1988 | Tateno et al. | 477/78 |
| 6,079,767 A | * | 6/2000 | Faubert et al. | 296/155 |
| 6,178,699 B1 | * | 1/2001 | Kawanobe et al. | 49/360 |
| 6,199,322 B1 | * | 3/2001 | Itami et al. | 49/139 |
| 6,276,743 B1 | * | 8/2001 | Jyawook et al. | 296/155 |
| 6,405,485 B1 | * | 6/2002 | Itami et al. | 49/280 |
| 6,425,206 B1 | * | 7/2002 | Noda et al. | 49/360 |
| 6,435,600 B1 | * | 8/2002 | Long et al. | 296/155 |

* cited by examiner

*Primary Examiner*—Saul Rodriguez

(57) ABSTRACT

A clutch control system for moving an object, such as a vehicle door, lift gate or trunk, compares the motor speed with the object speed and engages the clutch when the motor and object speeds are almost equal. Controlling engagement based on the object and motor speeds ensures smooth transitions into a power assist mode and between the power assist mode and a power release mode without causing clutch shock.

14 Claims, 3 Drawing Sheets

DYNAMIC CLUTCH CONTROL

REFERENCE TO RELATED APPLICATIONS

This application claims priority to U.S. Provisional Patent Application Ser. No. 60/318,944 filed Sep. 13, 2001.

TECHNICAL FIELD

The present invention is directed to a control system for a power-operated moving object, such as a vehicle door, gate, or trunk, and more particularly to a control system that controls clutch engagement during power-operated movement of the moving object.

BACKGROUND OF THE INVENTION

Systems for moving objects, such as openable vehicle body members (e.g., sliding vehicle doors, lift gates, trunks, and the like), often incorporate a clutch to allow a user to move the object/openable member manually. Vehicles, particularly larger vehicles such as sport utility vehicles and mini vans, may have systems as a sliding door or lift gate that incorporate a clutch. In these systems, the clutch is engaged only when a controller takes over movement of the openable member.

More particularly, when a controller senses the user's manual movement of the object, the controller takes over movement of the object in a power assist function by engaging the clutch and starting the motor. Because the clutch engages when the object is moving faster than the motor, however, the speed difference between the object and the motor may cause clutch shock.

If the user wishes to move the object more quickly than the speed dictated by the controller, the controller may initiate a power release function by monitoring the speed and/or force of the object movement. More particularly, if the speed and/or force exceed a selected threshold, the controller allows the user to continue moving the object without any motor assistance.

However, because the conditions for initiating a power assist function can become true before the conditions for a power release function become true, the clutch may be engaged and the controller may take over even after the power release conditions have been met, which is not desirable for a user who wants to operate an object manually.

There is a desire for a control system that avoids clutch shock in both power assist and power release operations. There is also a desire for a control system that can easily distinguish between a power assist condition and a power release condition.

SUMMARY OF THE INVENTION

The present invention is directed to a control system and method that compares the motor speed with the object speed and engaging the clutch when the motor and object speeds are almost equal. The invention is also directed to a control system and method that can distinguish between a power assist condition and a power release condition and control clutch engagement accordingly. In one embodiment, the system controls the motor speed so that it increases at a gradual rate, ensuring that the control system can distinguish between the power assist condition and the power release condition. By waiting until the motor and the object are moving at nearly the same speed before engaging the clutch, the inventive control system avoids clutch shock and allows smooth clutch engagement. The invention also smoothes transitions between the power assist mode and the power release mode to prevent clutch shock when switching between the two modes.

DETAILED DESCRIPTION OF THE EMBODIMENTS

Figure 1:
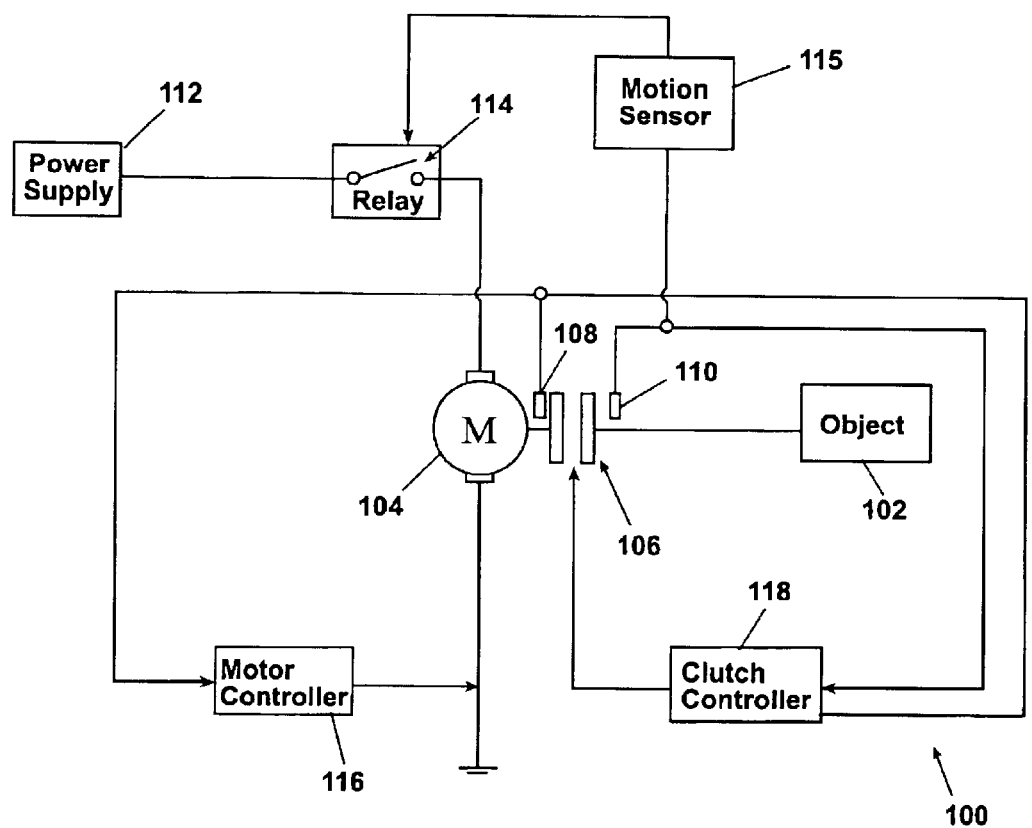
FIG. 1 is a schematic diagram of a control system according to one embodiment of the invention.

FIG. 1 is a schematic diagram illustrating a control system 100 according to one embodiment of the invention. The system 100 controls power movement of an object 102, such as a vehicle door, trunk, lift gate, sliding door, etc. Although the example shown in the figures and described below focuses on moving a vehicle component, the object moved by the system 100 can be any object movable by a motor and clutch assembly.

The system 100 includes a motor 104 and a clutch 106 that selectively connects and disconnects the object 102 from the motor 104. A first speed sensor 108 detects the speed of the motor 104, while a second speed sensor 110 detects the speed of the object 102. The speed sensors 108, 110 can be any type of speed sensor appropriate for monitoring the speeds of the motor 104 and object 102 respectively, such as an encoder, Hall effect sensor, or other type of sensor. Note that the first speed sensor 108 may detect the speed of the motor 104 by estimating the motor speed from a measured voltage across the motor 104 instead of measuring the motor speed directly. In this case, the sensor 108 acts as a voltage meter. The sensor 108 or other device would calculate an estimated speed from the sensed voltage according to any known method.

A power supply 112 sends power to the motor 104, while a bi-directional relay, H-bridge power transistor or other motor actuator 114 connects and disconnects the motor 104 from power supply 112 and changes the direction of the object movement. In one embodiment, a motion sensor 115 detects power assist and power release conditions by monitoring the speed and force applied to the object. The motion sensor 115 closes the relay 114 to start the motor 104 and also sets a power assist flag 200 (FIG. 2) if it detects and confirms movement of the object 102 when the clutch 106 is not engaged. The motion sensor 115 also sets a power release flag 202 if it detects and confirms that the speed or force applied to the object 102 in the same direction as the object's movement exceeds a threshold value and clears the power release flag 202 if it detects and confirms that object speed falls below the threshold value.

A motor controller 116 controls the speed of the motor 104 in any known manner. The motor controller 116 receives power assist flag from the motion sensor 115 and, if the power assist flag 200 is set, sets the motor flag 204 to initiate motor movement. The power assist flag 200 can therefore be considered one of the inputs that initiate object movement. In one embodiment, the motor flag 204 may also set by an input from a switch (not shown) in the vehicle to allow manual initiation of motor movement. The motor controller 116 regulates the motor speed by adjusting the voltage applied to the motor. In one embodiment, the motor controller 116 increases the motor speed gradually at a relatively low rate to make it easier to distinguish between the power assist condition and the power release condition, as will be explained in greater detail below.

A clutch controller 118 controls engagement and disengagement of the clutch 106 based on output signals from the speed sensors 108, 110. The clutch controller 118 disengages the clutch 106 when it receives the power release flag 202 from the motion sensor 115. The clutch controller 118 itself can be any device, such as a microprocessor, that can receive and process the speed sensor 108, 110 signals, or it can be a one or more subroutines within a microprocessor that includes multiple control system functions. The output of the speed sensor 108 associated with the motor 104 is also sent to the motor controller 116 to form a feedback loop.

Figure 2:
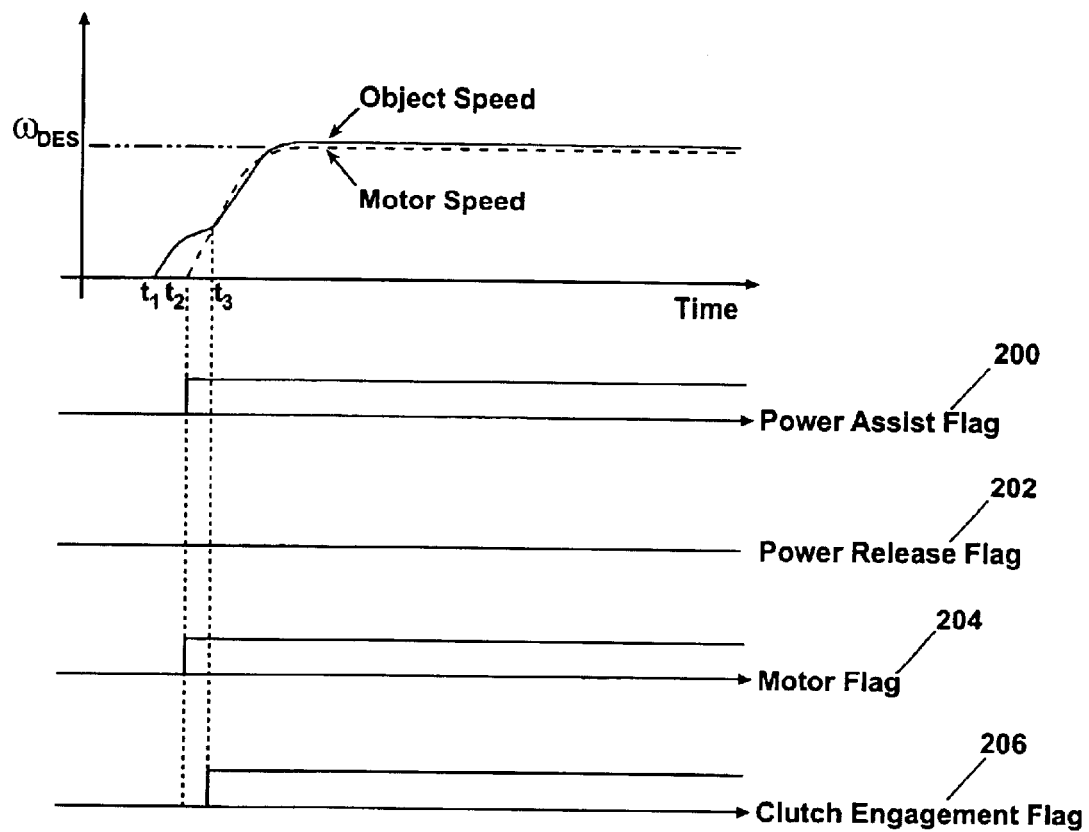
FIG. 2 is a timing diagram illustrating operation of one embodiment of the inventive control system when a user manually moves an object at a low speed.
Figure 3:
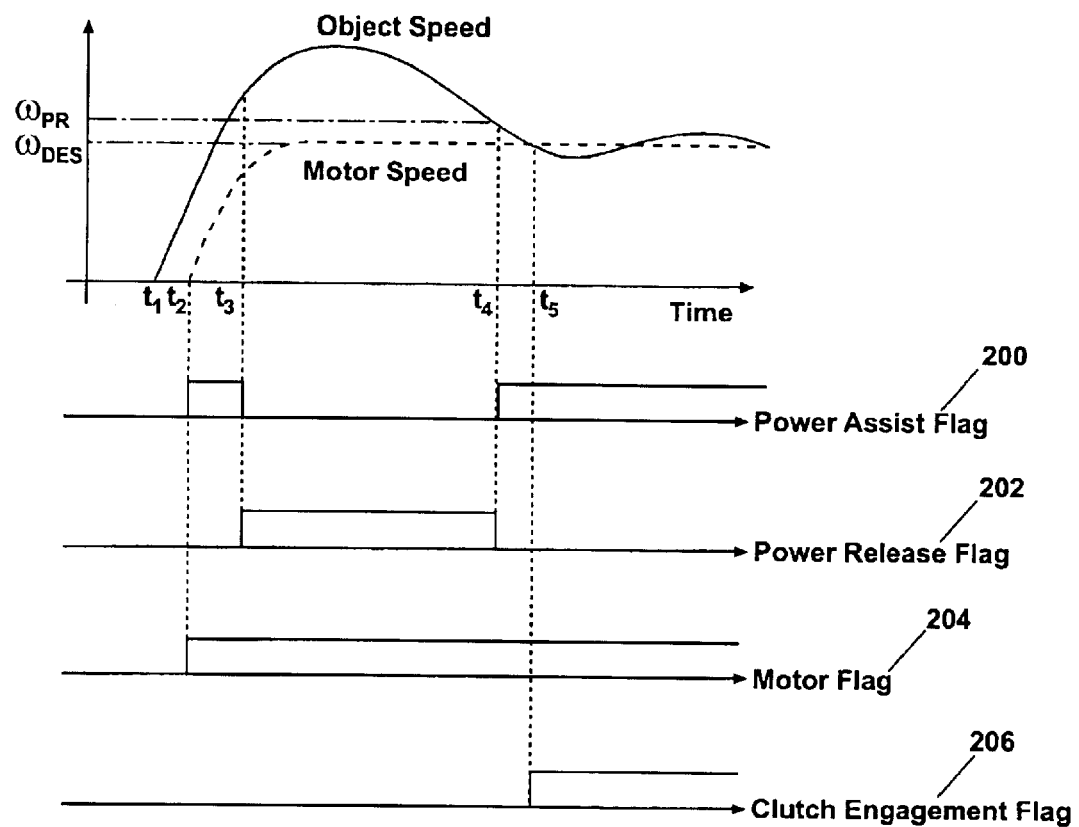
FIG. 3 is a timing diagram illustrating operation of one embodiment of the inventive control system when a user manually moves an object at a high speed

FIGS. 2 and 3 are timing diagrams illustrating the way the clutch controller 118 evaluates the signals from the speed sensors 108, 110 to determine whether to engage or disengage the clutch 106. FIG. 2 illustrates clutch controller 118 operation when a user moves the object at a low speed, while FIG. 3 illustrates clutch controller 118 operation when a user moves the object 102 at a high speed.

The system 100 in this example operates according to four flags: a power assist flag 200 (indicating that the system 100 is in a power assist mode), a power release flag 202 (indicating that the system 100 is in a power release mode), a motor flag 204 (indicating that the motor 104 is moving), and a clutch engagement flag 206 (indicating that the clutch 106 is engaged). Referring to FIG. 2, the motion sensor 115 first detects manual movement of the object 102 at time $t_1$ and confirms the movement at time $t_2$, setting power assist flag to indicate that the system 100 is in a power assist mode. Once the motor controller 116 receives the power assist flag 200, it sets the motor flag 204 to close the relay 114 and connect the motor 104 with the power supply 112, thereby starting the motor 102 in the same direction as the manual movement of the object 102. In one embodiment, the motion sensor 115 waits a predetermined amount of time before setting the power assist flag 200 to ensure that the object 102 is indeed being moved manually.

When the motor 104 starts moving, the speed sensor 108 associated with the motor 104 detects the speed of the motor and notifies the clutch controller 118 of the motor speed. The clutch controller 118 keeps the clutch 106 disengaged at time $t_2$ even though the system is in the power assist mode because there is still a difference between the motor speed and the object speed. If the clutch 106 were allowed to engage at time $t_2$, the speed difference would cause undesirable clutch shock.

Once the object speed and motor speed match each other at time $t_3$, the clutch controller 118 sets the clutch engagement flag 206, instructing the clutch 106 to engage. Because the object 102 and the motor 104 are moving at the same speed when the clutch 106 engages, the engagement does not cause clutch shock. After engagement, the motor 104 drives the object 102 and gradually increases in speed until it reaches a desired speed $\omega_{DES}$. The motor speed, and therefore the object speed, is maintained at the desired speed until the object 102 reaches a target position, which is usually either in a fully open or fully closed position. In the example shown in FIG. 2, the object speed increases slowly enough for the motor speed to catch up to it and assist movement of the object 102.

FIG. 3 illustrates an example where the system 100 moves between the power assist mode and the power release mode. In this example, the object speed increases too quickly to warrant power assistance. To determine when to switch to a power assist mode or a power release mode, the motion sensor 115 detects when the object speed passes a power release threshold $\omega_{PR}$. In this example, the power release threshold $\omega_{PR}$ is slightly higher than the desired object speed $\omega_{DES}$.

Like the example shown in FIG. 2, the motion sensor 115 detects when the object 102 is being moved manually at time $t_1$ and sets power assist flag 200 at time $t_2$, and the motor controller receives the power assist flag and sets motor flag to initiate movement of the motor. The motor speed then increases gradually up to the desired object speed $\omega_{DES}$. Because the object speed increases faster than the motor speed in this example, however, the motor speed does not catch up to the object speed until the object speed falls below the power release threshold $\omega_{PR}$. As a result, the clutch controller 118 never sets the clutch engagement flag 206, nor the system 100 does take control even though the power assist flag 200 is set.

Instead, when the clutch controller 118 confirms that the object speed has crossed the power release threshold $\omega_{PR}$ at time $t_3$, motion sensor 115 sets the power release flag 202, indicating that the system 200 is in a power release mode. The system 100 then allows the object 102 to continue to be moved manually without any power assistance. Note that even though the motor 104 is still moving at the desired speed $\omega_{DES}$ during the power release mode, the clutch 106 is not engaged (as indicated by the cleared clutch engagement flag 206) and therefore the object movement is not assisted by the motor 104 at this point.

If the user stops moving the object manually, the object speed starts to decrease and eventually drops below the power release threshold $\omega_{PR}$, causing the motion sensor 115 to detect the drop and clear the power release flag 202 at time $t_4$. The clutch controller 118 then sets the clutch engagement flag 206, instructing the clutch 106 to engage, when the object speed is close enough to the motor speed, which has been maintained at the desired speed at time $t_5$. Because the object speed and the motor speed are virtually the same when the clutch 106 engages, the object speed quickly matches the motor speed after engagement. The system 100 therefore minimizes or eliminates clutch shock, creating a smooth transition from the power release mode to the power assist mode.

Although the above examples show that the clutch controller 118 engages the clutch 106 when the object speed and the motor speed are substantially equal to each other, in practice the clutch controller 118 may calculate the speed difference between the object 102 and the motor 104 and engage the clutch 106 when the speed difference is below a predetermined difference threshold. By adjusting the predetermined speed difference threshold value, the rate at which the motor speed increases, and the difference between the power assist and the power release thresholds, the system 100 can be adjusted to ensure smooth initial clutch engagement and smooth transitions between the power assist and power release modes.

Further, any time delays between the setting of the clutch engagement flag 206 and actual clutch 106 engagement can be compensated through any known manner, such as by predicting the object and motor speed difference several seconds into the future and engaging the clutch based on the predicted speed difference rather than the actual speed difference. Regardless of the specific way in which the system 100 determines when to engage and disengage the clutch 106, the invention avoids clutch shock by engaging the clutch 106 only when the object 102 and the motor 104 are moving at nearly the same speed.

It should be understood that various alternatives to the embodiments of the invention described herein may be employed in practicing the invention. It is intended that the following claims define the scope of the invention and that the method and apparatus within the scope of these claims and their equivalents be covered thereby.

We claim:

1. A clutch control system for assisting movement of an openable vehicle body member, comprising:
   a motor;
   a first speed sensor that detects a motor speed;
   a second speed sensor that detects an openable member; and
   a clutch operatively coupled to the first and second speed sensors, wherein the clutch selectively engages to couple the openable member with the motor by engaging if a difference between the motor speed and the openable member speed falls below a difference threshold.

2. The system of claim 1, wherein the openable member is at least one selected from the group consisting of a vehicle door, a sliding door, a trunk, and a lift gate.

3. The system of claim 1, wherein the motor starts operation after manual movement of the openable member has been confirmed.

4. The system of claim 3, further comprising:
   a motion sensor coupled to the second speed sensor to detect movement of the openable member; and
   a motor actuator responsive to the motion sensor to start operation of the motor.

5. The system of claim 4, wherein the motor actuator is a relay.

6. The system of claim 1, further comprising a clutch controller that receives the motor speed and the openable member speed from the first and second speed sensors, respectively, and controls the selective engagement of the clutch.

7. The system of claim 6, wherein the clutch controller determines the difference between the motor speed and the openable member speed and sets an engagement flag to engage the clutch when the difference between the motor speed and the openable member speed fails below the difference threshold.

8. A clutch control system for assisting movement of an openable vehicle body member, comprising:
   a motor;
   a first speed sensor that detects a motor speed;
   a second speed sensor that detects a openable member speed; and
   a clutch coupled to the first and second speed sensors, wherein the clutch selectively engages to couple the openable member with the motor based on a relationship between the motor speed, the openable member speed, a desired speed, and a power release threshold speed,
   wherein the clutch engages if a difference between the motor speed and the openable member speed falls below a difference threshold,
   wherein the clutch does not engage if the openable member speed moves above the power release threshold before the motor speed reaches the desired speed, and
   wherein the clutch engages if the openable member speed moves from the power release threshold to the desired speed.

9. The system of claim 8, wherein the openable member is at least one selected from the group consisting of a vehicle door, a sliding door, a trunk, and a lift gate.

10. The system of claim 8, wherein the motor starts operation after manual movement of the openable member has been confirmed.

11. The system of claim 10, further comprising:
    a motion sensor coupled to the second speed sensor to detect movement of the openable member; and
    a motor actuator responsive to the motion sensor to start movement of the motor.

12. The system of claim 11, wherein the motor actuator is a relay.

13. The system of claim 8, further comprising a clutch controller that receives the motor speed and the openable member speed from the first and second speed sensors, respectively, and controls the selective engagement of the clutch.

14. The system of claim 13, wherein the clutch controller calculates the difference between the motor speed and the openable member speed and sets an engagement flag to engage the clutch when the difference between the motor speed and the openable member speed falls below the difference threshold.

* * * * *